(12) United States Patent
Yen et al.

(10) Patent No.: US 8,677,480 B2
(45) Date of Patent: Mar. 18, 2014

(54) ANOMALY INFORMATION DISTRIBUTION WITH THRESHOLD

(75) Inventors: Chui-Tin Yen, Sunnyvale, CA (US); Saumyavapuh Lugani, San Jose, CA (US); Snigdhendu Mukhopadhyay, San Jose, CA (US); Rajiv Raghunarayan, Fremont, CA (US); Sumeet Singh, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1294 days.

(21) Appl. No.: 12/203,658

(22) Filed: Sep. 3, 2008

(65) Prior Publication Data

US 2010/0058469 A1    Mar. 4, 2010

(51) Int. Cl.
*G06F 21/00*    (2013.01)
(52) U.S. Cl.
USPC ............... 726/22; 726/23; 726/24; 726/25; 713/181; 713/188; 709/224
(58) Field of Classification Search
USPC ............... 726/22–25; 713/181, 188; 709/224
See application file for complete search history.

(56) References Cited

U.S. PATENT DOCUMENTS

| 7,457,965 | B2 * | 11/2008 | Tamura et al. | 713/182 |
| 7,673,342 | B2 * | 3/2010 | Hursey et al. | 726/24 |
| 7,849,187 | B2 * | 12/2010 | Chang et al. | 709/224 |
| 7,917,957 | B2 * | 3/2011 | Chow et al. | 726/24 |
| 2003/0196095 | A1 * | 10/2003 | Jeffries et al. | 713/181 |
| 2003/0212903 | A1 * | 11/2003 | Porras et al. | 713/200 |
| 2005/0229254 | A1 | 10/2005 | Sing et al. | |
| 2006/0291490 | A1 * | 12/2006 | Omote et al. | 370/401 |
| 2007/0094730 | A1 * | 4/2007 | Bhikkaji et al. | 726/24 |
| 2008/0307524 | A1 * | 12/2008 | Singh et al. | 726/22 |
| 2009/0154406 | A1 * | 6/2009 | Kim et al. | 370/329 |

OTHER PUBLICATIONS

Sumeet Singh et al., "Automated Worm Fingerprinting," OSDI 2004: pp. 1-16 <http://www-cse.ucsd.edu/~savage/papers/OSDI04.pdf>.

* cited by examiner

*Primary Examiner* — Tae Kim
*Assistant Examiner* — Joseph Pan
(74) *Attorney, Agent, or Firm* — Patterson & Sheridan, LLP (57) ABSTRACT

Embodiments of the present disclosure provide techniques for distributing information about possible anomalies in a network. A sensor in a network may detect packets with payloads that match an anomaly signature. Address dispersion information, for example, in the form of source and address bitmaps, may be gathered at the sensor. The address dispersion information may be distributed to one or more peer sensors if the information indicates that the number of different addresses of the detected matching packets exceeds a threshold.

18 Claims, 9 Drawing Sheets

FIG. 5A ( DETECT MALICIOUS PAYLOAD )
DISTRIBUTION THRESHOLD EXCEEDED

FIG. 5B ( GENERATE AND PUBLISH
SIGNATURE TO PEERS )

FIG. 5C ( S2 RECEIVES SIGNATURE AND PROPAGATES )

FIG. 7A (DETECT MALICIOUS PAYLOAD)
DETECTION THRESHOLD EXCEEDED

FIG. 7B (S1 NOTIFIES COLLECTOR)

FIG. 7C (COLLECTOR PROCESSES BITMAP FROM S1
DISTRIBUTES CONFIRMED SIGNATURE TO
SENSORS S1 - S4)

ANOMALY INFORMATION DISTRIBUTION WITH THRESHOLD

BACKGROUND

1. Technical Field

Embodiments of the present disclosure generally relate to network security and, more particularly, to detection of malicious payload.

2. Description of the Related Art

In networks, malicious code (commonly referred to as anomalies or malware) may intrude and steal system resources. Such malware is often polymorphic in nature, avoiding detection by altering the content of their payload in an effort to avoid detection.

Advanced detection techniques utilize Automatic Signature Extraction (ASE) algorithms that are capable of extracting common signatures for malware packets, even if some portion of the content is altered. Unfortunately, such malware may spread rapidly, propagating too many network nodes before detection.

Therefore, what is needed is a technique to rapidly detect malware.

SUMMARY

Embodiments of the present disclosure generally provide methods and apparatus for distributing information about possible anomalies in a network.

The method generally includes detecting matching packets with payloads that match an anomaly signature, gathering address dispersion information for the matching packets, the address dispersion information providing an indication of a number of different addresses of the matching packets, wherein the different addresses comprise at least one of source addresses and destination addresses, and distributing the address dispersion information for the matching packets to one or more peer nodes if the address dispersion information indicates the number of different addresses of the matching packets exceeds a distribution threshold.

One apparatus generally includes logic for detecting matching packets, received over a network, with payloads that match an anomaly signature, a data structure for gathering address dispersion information for the matching packets, the address dispersion information providing an indication of a number of different addresses of the matching packets, wherein the different addresses comprise at least one of source addresses and destination addresses, and logic for distributing the address dispersion information for the matching packets to one or more peer nodes in the network if the address dispersion information indicates the number of different addresses of the matching packets exceeds a distribution threshold.

One apparatus generally includes means for detecting matching packets, received over a network, with payloads that match an anomaly signature, means for gathering address dispersion information for the matching packets, the address dispersion information providing an indication of a number of different addresses of the matching packets, wherein the different addresses comprise at least one of source addresses and destination addresses, and means for distributing the address dispersion information for the matching packets to one or more peer nodes in the network if the address dispersion information indicates the number of different addresses of the matching packets exceeds a distribution threshold.

BRIEF DESCRIPTION OF THE DRAWINGS

So that features of the present disclosure can be understood in detail, a particular description of the present disclosure may be had by reference to embodiments, some of which are illustrated in the appended drawings. It is to be noted, however, that the appended drawings illustrate only typical embodiments of this disclosure and are therefore not to be considered limiting of its scope, for the present disclosure may admit to other equally effective embodiments.

DETAILED DESCRIPTION OF THE PREFERRED EMBODIMENTS

Embodiments of the present disclosure provide techniques for a network sensor to distribute information about possible anomalies to neighboring sensors in a network. By distributing information, such as address dispersion information generated by monitoring source/destination address of packets with payloads that match an anomaly signature, the network of sensors may be able to more quickly classify an anomaly as a valid threat, which may prevent damage.

For certain embodiments, address dispersion information may be generated and tracked by setting bits in source and/or destination bitmaps to indicate addresses observed in matching packets. Each bit may correspond to an address, range of addresses, or a hash generated based on an address. In any case, a high count of bits set in a bitmap corresponds to a high degree of address dispersion (which may indicate wide spread propagation). Sharing this address dispersion information with other sensors lets those sensors know packets matching a given signature have been observed at other sensor locations, and how often. As a result, each sensor may have an up-to-date view of the network, which may lead to faster anomaly detection.

Example Network Topology

Figure 1:
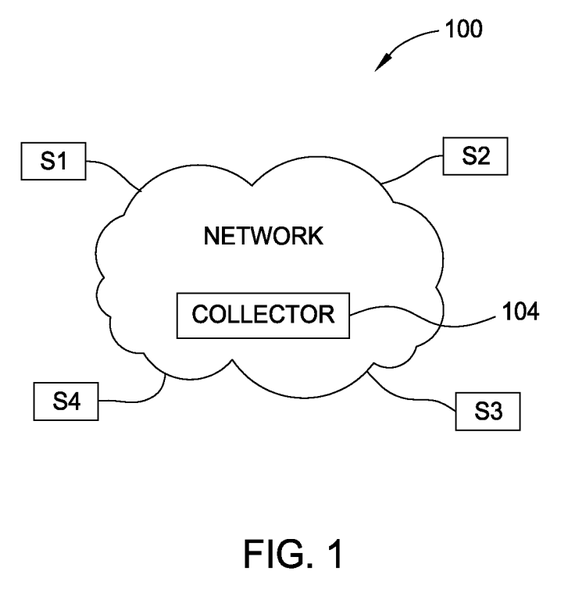
FIG. 1 illustrates an example network topology according to an embodiment in the present disclosure.

FIG. 1 illustrates an example network 100 in which anomaly information may be shared among multiple sensors, in accordance with embodiments of the present disclosure. For illustrative purposes, four sensors S1-S4 are shown however, actual networks may have hundreds of sensors or more. As used herein, the term sensor generally refers to any type of device used to inspect network traffic and, in some embodiments, may implement Automatic Signature Extraction (ASE) algorithms. A sensor may be a standalone device or may be integrated into a network component, such as a switch or router.

The network 100 may use any combination of wireless and wireline transmission services and may include Intranet and/or the Internet. The sensors may operate as peers in a peerto-peer network that share information about potential threats, as described herein. As illustrated, the network may have a collector component 104. As will be described in greater detail below, the sensors may notify the collector 104 of potential threats and the collector 104 may serve as a repository for information on potential threats and may also notify some or all the sensors when a potential threat has been validated.

Figure 2:
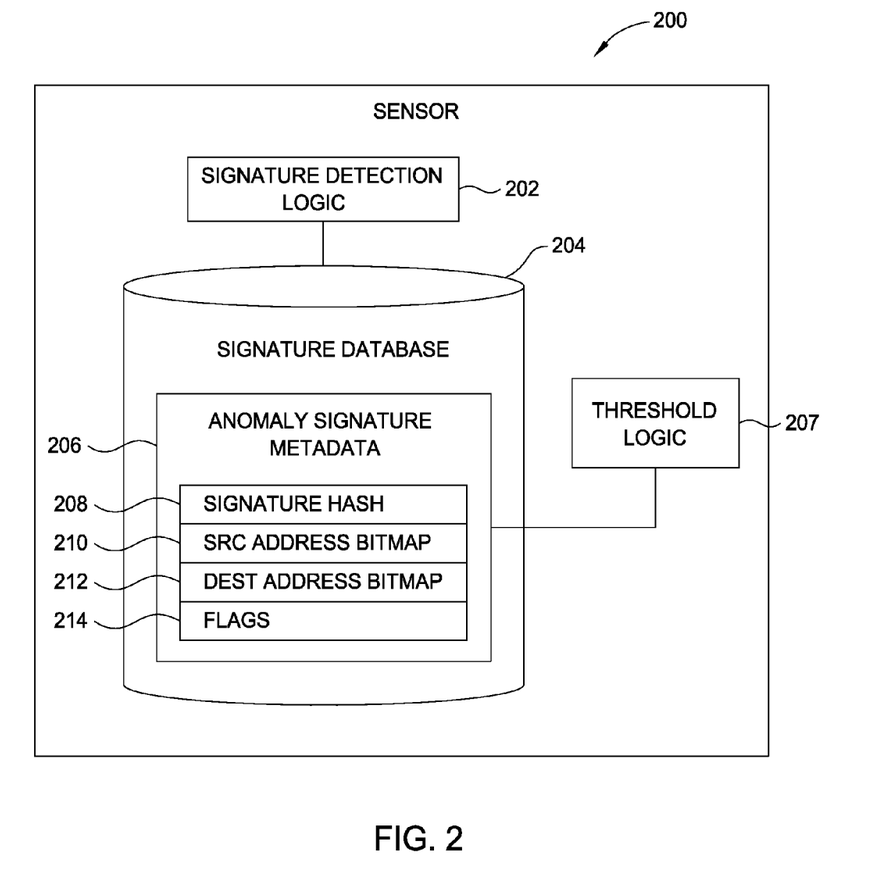
FIG. 2 illustrates an example sensor according to an embodiment in the present disclosure.

The sensors may include any suitable components to monitor network traffic, extract signatures for potential anomalies, detect when payload in packets match a given signature, and gather corresponding information or "metadata" about the signature. FIG. 2 illustrates an example sensor 200 according to an embodiment. As illustrated, the sensor 200 may include signature detection logic 202, threshold logic 207 and a signature database 204.

The signature detection logic 202 may monitor network traffic in an effort to detect packets with payloads that match an anomaly signature (matching packets). The anomaly signatures may be generated, for example, based on analysis of packets with similar content. The signature detection logic 202 may employ any suitable signature extraction algorithm. For some embodiments, the signature detection logic may utilize algorithms that generate different hash values on different portions of a packet to overcome polymorphic attacks that vary certain content in an effort to avoid detection.

In response to detecting a matching packet, the signature detection logic 202 may extract various types of parameters, collectively referred to as signature metadata 206, based on content of the matching packet. For some embodiments, the signature detection logic 202 may not bother to generate and maintain signature metadata 206 until a signature has been observed for some predetermined number of times (e.g., a prevalence threshold).

As illustrated, the metadata may include a variety of different data elements, such as a signature hash 208, source address bitmap 210, destination address bitmap 212 and one or more bitmap counters 214. The signature hash 208 may be generated by any suitable signature generation algorithm. While a list of source and destination addresses could be maintained, such a list might grow very large and maintaining such lists for several anomalies might prove prohibitive. For certain embodiments, bitmaps provide an efficient structure to track address dispersion information.

The bitmaps may be used to track address dispersion, by providing an indication of the number of different addresses (or address ranges) that have been observed in source and destination addresses of matching packets. High address dispersion may be indicative of an attack that is spreading to different network nodes. A large number of different source addresses will indicate the attack has already spread to different nodes, while a large number of destination addresses will indicate the attack is still propagating to other nodes. Each bit in an address bitmap may be indicative of the observance of a corresponding address (or address in a given address range) in a matching packet. Therefore, a measure of address dispersion may be provided by counters 214 that track the number of bits that are set in an address bitmap.

The threshold logic 207 may track address dispersion by monitoring the bitmap count(s) 214 and comparing them against one or more thresholds to decide if signature information should be propagated and/or an anomaly should be classified as a probable threat.

For example, the threshold logic 207 may compare bitmap counters to a distribution threshold set to correspond to a given level of address dispersion that warrants notifying neighboring sensors. If this distribution threshold is exceeded, a sensor will distribute anomaly information (e.g., address dispersion in the form of the bitmaps and other information) to peer sensors.

For certain embodiments, an originating sensor may distribute anomaly information in the form of a request for information sent to neighbor sensors. As will be described in greater detail below, receiving nodes may aggregate the information received from the originating sensor with locally generated information about the anomaly. A receiving sensor may reply to such a request (from an originating sensor) with a response that includes its own information gathered for the corresponding anomaly. For certain embodiments, the receiving sensor may also propagate the request to its neighbors, based on an intelligent distribution algorithm designed to limit redundant transmissions.

In addition to sharing address dispersion information, parameters such as the number of occurrences of each anomaly are also shared between the sensors for categories such as port, timeframe, and protocol, or more generally, anything that can help determine if a bitstream is anomalous or not. Information shared may be a list of suspected signatures along with the occurrence rate of each signature which may be sent in summary form by using a Bloom Filter. A bitmap counter that summarizes a list of source and destination addresses that have been traversed may be shared. A list of IP addresses that are suspected of sending packets with a probable threat may be shared. Aggregate header information about suspected anomalies (SYN, SYN ACK, ICMP and RST, etc.) may also be shared.

Information Distribution

As described above, under certain conditions, a sensor may choose to notify other sensors of an anomaly by sharing information after enough packets matching a signature for the anomaly have been seen. This sharing of information may allow each sensor to maintain a current view of the activity of the potential threat in the network and may help speed detection, limit propagation, and minimize damage.

Figure 3:
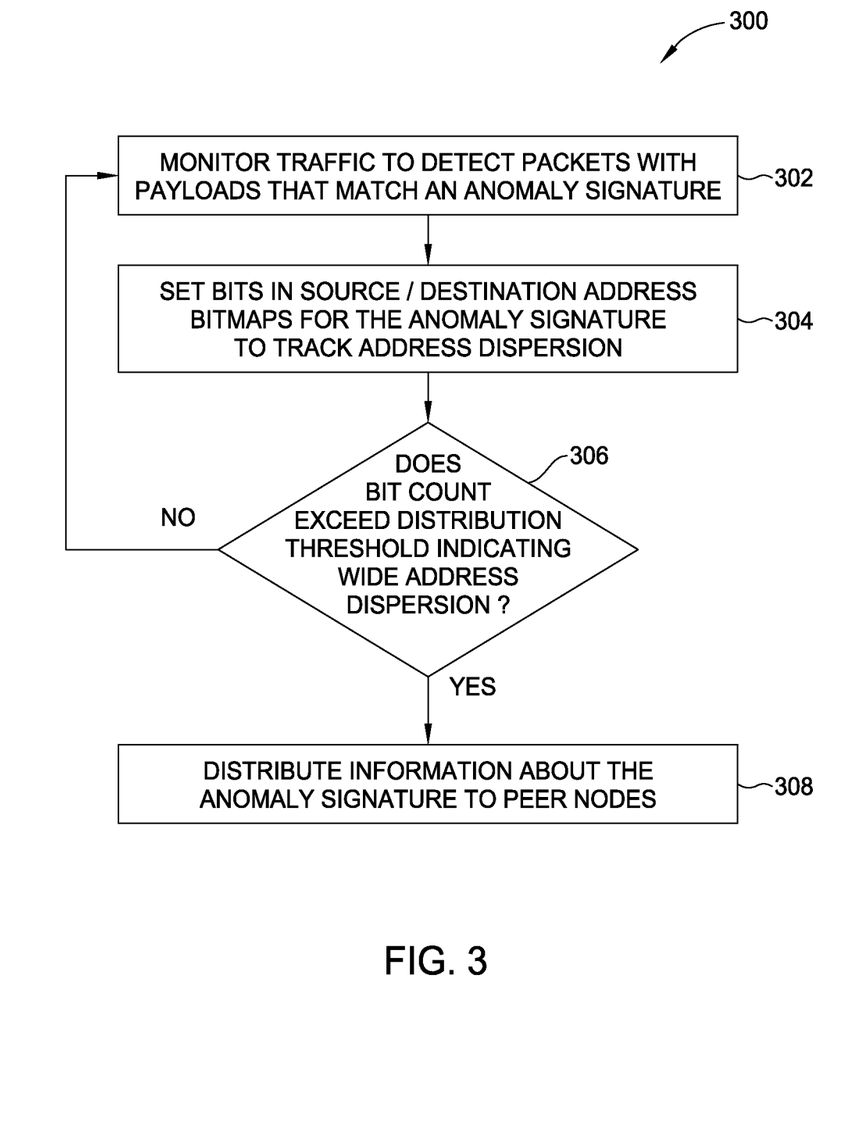
FIG. 3 is a flow chart of example operations for distributing information about a potential anomaly to neighbor sensors according to an embodiment in the present disclosure.

FIG. 3 illustrates example operations 300 that may be performed at a sensor for distributing information about an anomaly according to an embodiment. The operations begin, at 302, by monitoring traffic to detect packets with payloads that match an anomaly signature. At 304, the sensor sets bits in source and destination address bitmaps for the anomaly signature to track address dispersion.

The sensor may continue to monitor traffic and gather address dispersion information by setting bits in the address bitmaps until the bit count exceeds a distribution threshold, as determined at 306. When the bit count exceeds the distribution threshold, the sensor may distribute information about a corresponding anomaly, at 308. As described above, the information may be distributed in the form of a request that serves to both provide neighbor sensors with anomaly information generated by the originating sensor as well as request information about the anomaly generated by the neighbor sensors receiving the request.

Sharing anomaly information among sensors may help speed detection of an attack. For example, if many sensors see the same anomaly, there is a greater chance of the anomaly turning out to be a probable threat. A sensor may know with a greater degree of certainty that an anomaly is a probable threat if the ratio of the sensors which have seen the anomaly to those who have not seen the anomaly is greater than one. This ratio may be computed when gathering address information to prevent false positives.

Sensors receiving information from an originating sensor may act on the information in a number of ways. In some embodiments, the receiving sensor may distribute information to other neighbor sensors within some path distance, for example, within two hops of the originating sensor. In an effort to reduce redundant messaging and unnecessarily flooding the network with traffic, a receiving node may intelligently propagate a request containing information to other sensors, for example, based on a probability inversely proportional to the number of hops between the originating sensor and the possible receiving sensor.

Figure 4:
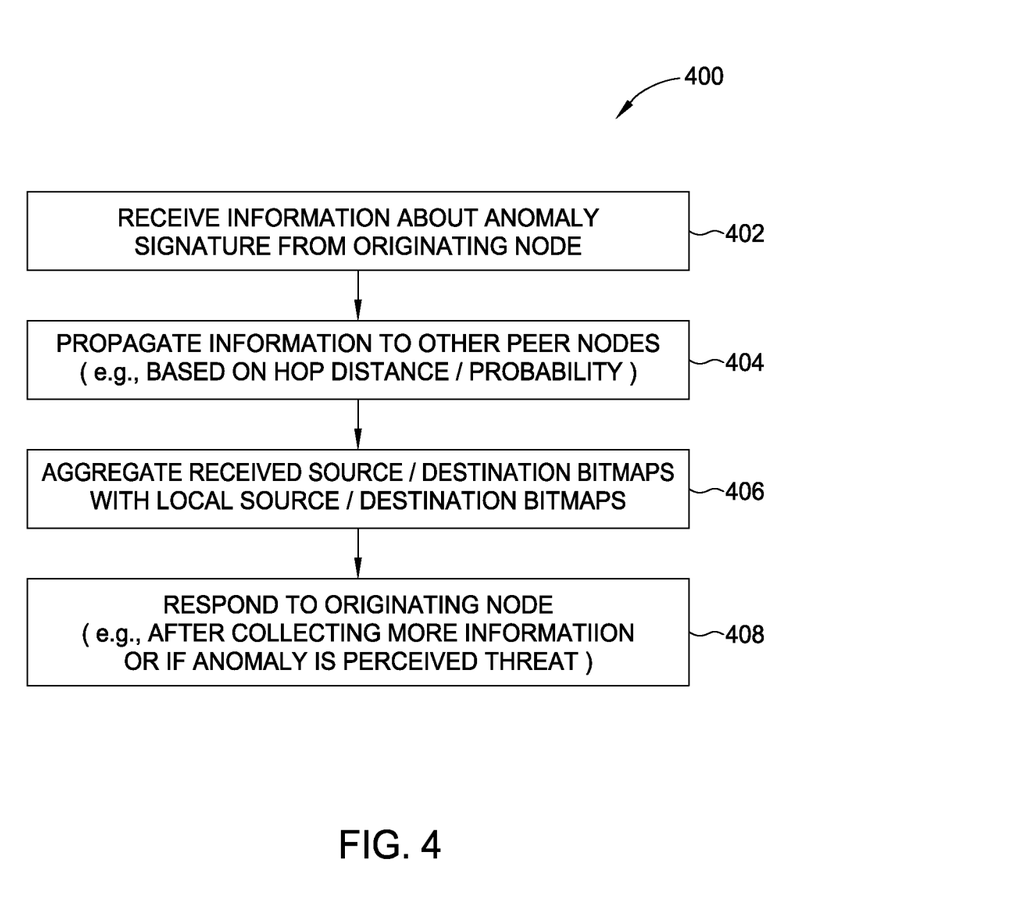
FIG. 4 is a flow chart of example operations for processing information about an anomaly received from a neighbor sensor according to an embodiment in the present disclosure.

FIG. 4 illustrates example operations 400 that a sensor may perform when receiving anomaly information from another sensor. The operations 400 begin, at 402, when the sensor receives information about an anomaly signature from an originating node (e.g., in the form of a request). At 404, the information may be propagated to other peer nodes. As described above, the propagation may occur based on a hop distance between the receiving node and the originating node or a probability.

At 406, received address dispersion information may be aggregated with locally generated address dispersion information, for example, by performing a bitwise OR function on bits in received bitmaps with local bitmaps. As will be described in greater detail below, if the aggregated address dispersion information indicates the number of different addresses of the matching packets exceeds a detection threshold (e.g., hither than the distribution threshold), the anomaly signature may be reported as a probable anomaly.

At 408, the receiving sensor may respond to the originating sensor. How and when the sensor responds may depend on a particular embodiment and particular circumstance. For example, a receiving node may delay responding to a request until after collecting more information. On the other hand, a receiving node may respond pro-actively (sooner) if the threat is perceived to be significant. The severity of the threat may be determined by checking gathered address dispersion information to see if the sensor has seen packets pertaining to the threat earlier. The severity of the threat may also be determined by checking to see if the received address dispersion information and the local address dispersion information of the receiving node are significantly different. If the receiving sensor deems the threat severe enough according to varying degrees of the above one or more factors, the receiving sensor may answer the originating sensor and/or send out its own request.

When distributing address dispersion information in the form of request messages, duplicated messages may be seen. To eliminate duplicate messages, sensors may maintain a table of the unique original sender ID, and a sequent number of the (original) address dispersion information message may be stored at the sensor so if the same message is received again, it will not be re-distributed. Additionally, when the message is sent, a sensor may append its source ID to the message so if it is seen again it will not be forwarded.

Further, in a Network Address Translation (NAT) scheme, multiple hosts may be sharing a few IP addresses. These hosts often use private IP addresses that may overlap with other sensors which may be problematic because the NAT addressing scheme may interfere with the accurate gathering of address dispersion information. There are several ways to solve this problem. If only a small amount of sensors are using NAT, NAT will not pose a material impact on false negatives and NAT may be ignored. One way to solve this problem is to enable sensing only on the directional traffic of the public interface. This method may best be used on NAT routers with multiple public IP's or NAT routers that sense just one or two active hosts. Another way to prevent this problem is to reverse the public IP endian and XOR the result with the private IP addresses. This XOR'ed value will be relatively unique. Another method to solve this problem may be to map one private IP address to the public IP address and map subsequent private IP addresses seen with the signatures using the XOR method described above.

Figure 5A:
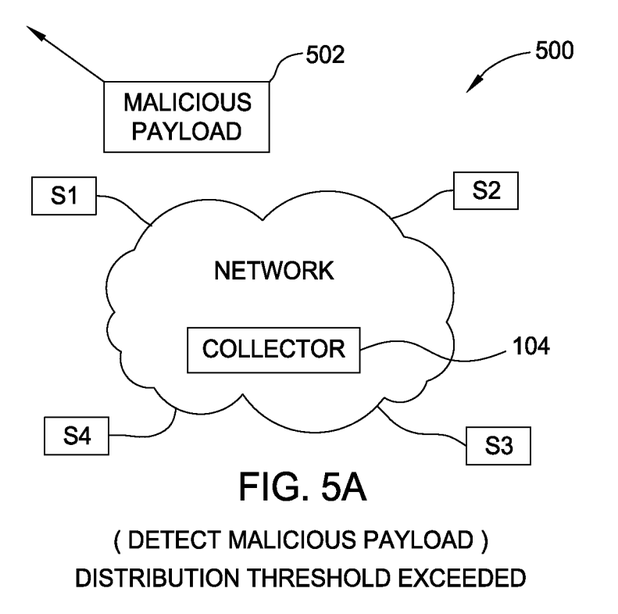
FIG. 5A-5D illustrate traffic flow for distributing information about a potential anomaly according to an embodiment in the present disclosure.

FIG. 5A-5D illustrate example transactions for distributing anomaly information in the network 100 according to an embodiment of the present disclosure. As illustrated in FIG. 5A, sensor S1 detects malicious payload 502 (e.g., that matches an anomaly signature). For purposes of illustration, it is assumed that when S1 sets bits in the bitmaps, the distribution threshold is exceeded.

Figure 5B:
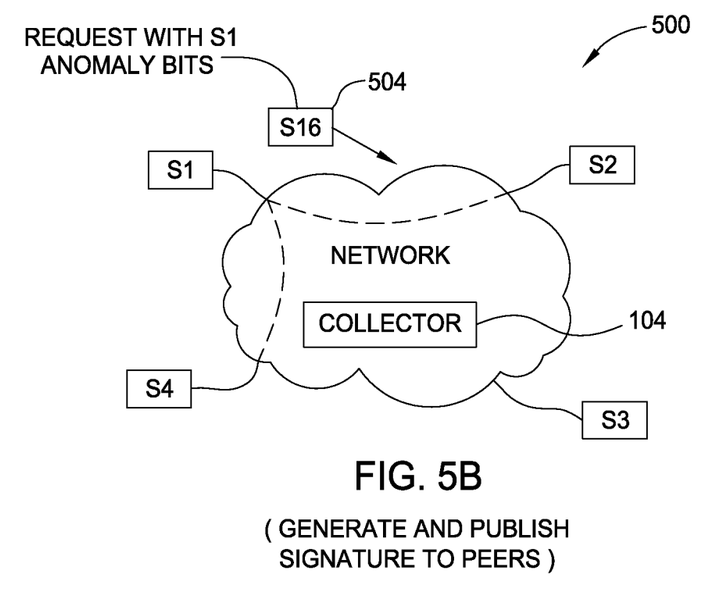

Therefore, as illustrated in FIG. 5B, S1 distributes anomaly information in the form of a request 504 to neighbor sensors S2 and S4. As described above, the anomaly information in the request may include a variety of information, such as the address bitmaps, bitmap counts, anomaly signature hash, and the like.

Figure 5C:
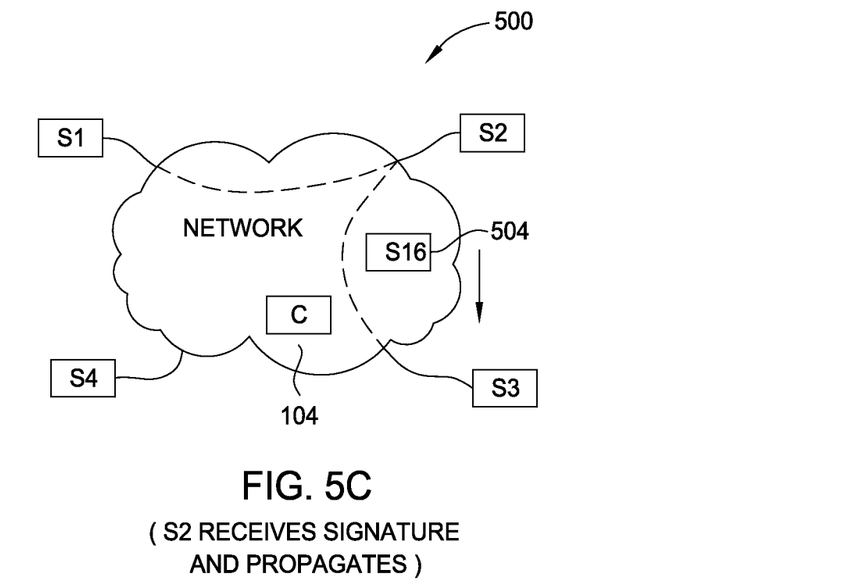

As described above, receiving sensors may propagate the request, in some cases, within some distance from the originating sensor. For example, as illustrated in FIG. 5C, sensor S2 may propagate the request 504 to neighboring sensor S3.

Figure 5D:
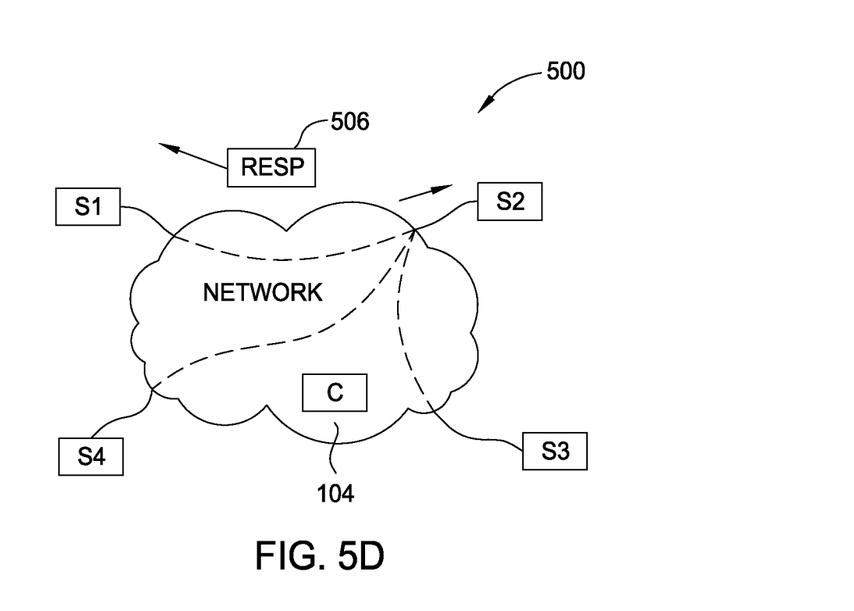

A receiving sensor may also respond to the request, in an effort to share its own information regarding the anomaly. For example, as illustrated in FIG. 5D, S2 may send a response 506 back to originating sensor S1.

As previously described, when a bit count exceeds a detection threshold, an anomaly may be classified as a probable threat and notification may be sent, for example, to a collector and/or to other nodes. The bit count may exceed a detection threshold as a result of increasing the bit count in response to "locally" detecting a matching packet or by aggregating bit maps received from an originating sensor with locally generated bitmap. For certain embodiments, a collector receiving a notification from a sensor, may send out a signature bitmap to a set of sensors or all sensors of a network to notify them of the validated threat.

Figure 6:
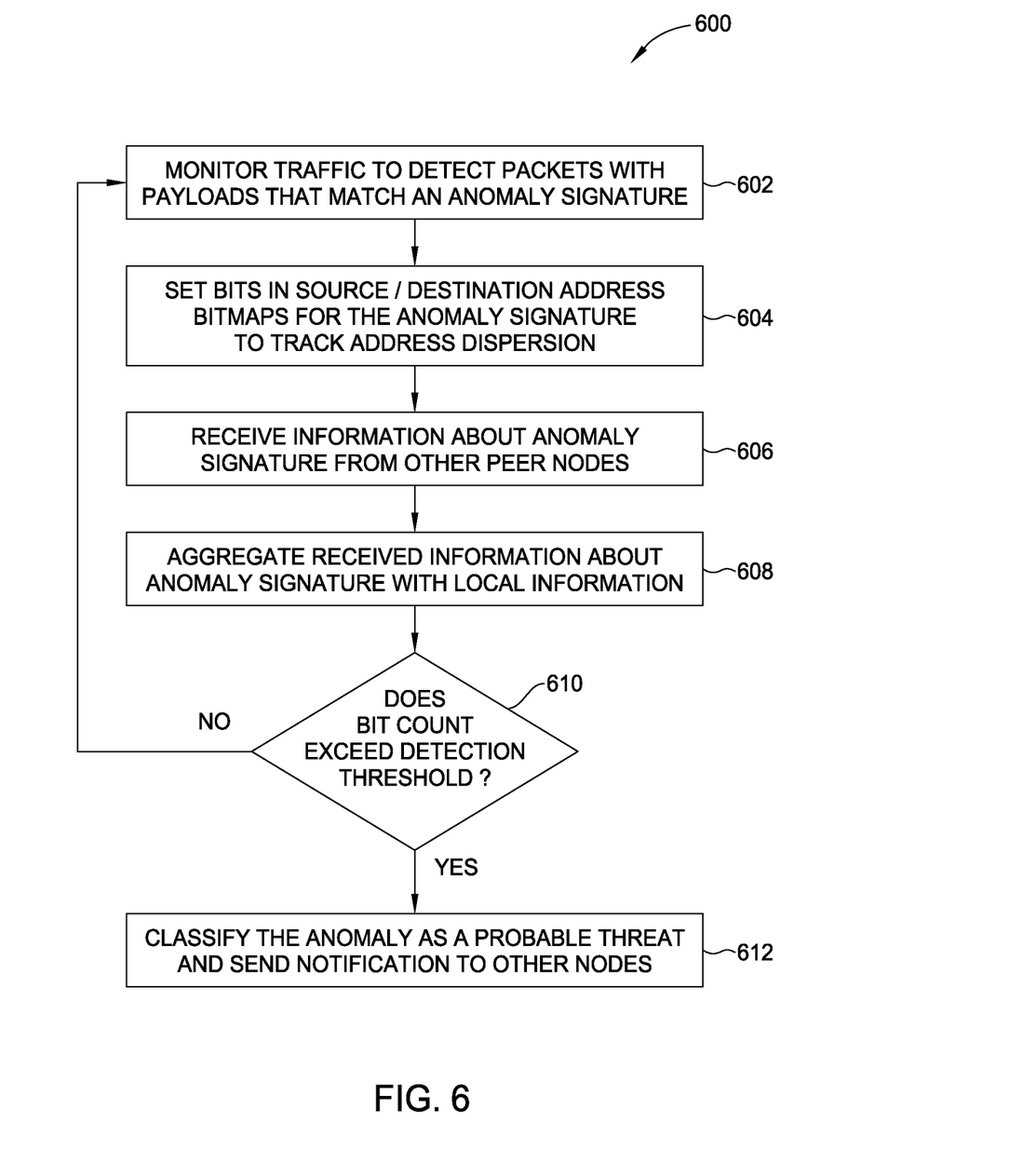
FIG. 6 is a flow chart of example operations for classifying a potential anomaly as a valid threat according to an embodiment in the present disclosure.

FIG. 6 is a flow chart of example operations 600 that may be performed by a sensor to classify a threat as valid when a detection threshold is exceeded. The operations begin, at 602, by monitoring traffic to detect packets with payloads that match an anomaly signature. At 604, the sensor sets bits in source/destination address bitmaps for the anomaly signature to track address dispersion. At 606, the sensor receives information about an anomaly signature from other (peer) sensors, for example, in the form of requests. At 608, this received information about the anomaly signature is aggregated with local information, for example, by bit-wise ORing of address bitmaps. If the received information included different address bits, the aggregation will result in additional bits being set.

The sensor may continue to gather information in this manner until the bit count exceeds the detection threshold, as determined at 610. Once the bit map exceeds the detection threshold, the threat may be classified as a probable threat, at 612, and other nodes may be notified.

Figure 7A:
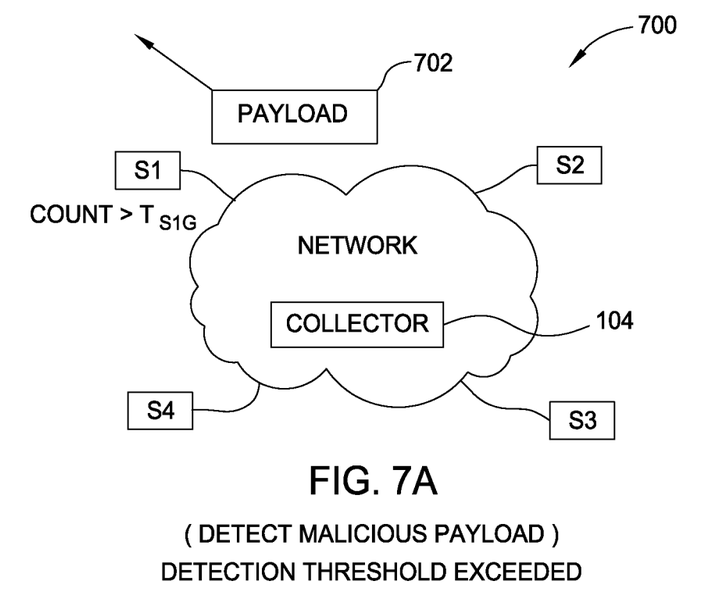
FIG. 7A-7C illustrate traffic flow for classifying a potential anomaly as a valid threat transactions for distributing information according to an embodiment in the present disclosure.
Figure 7B:
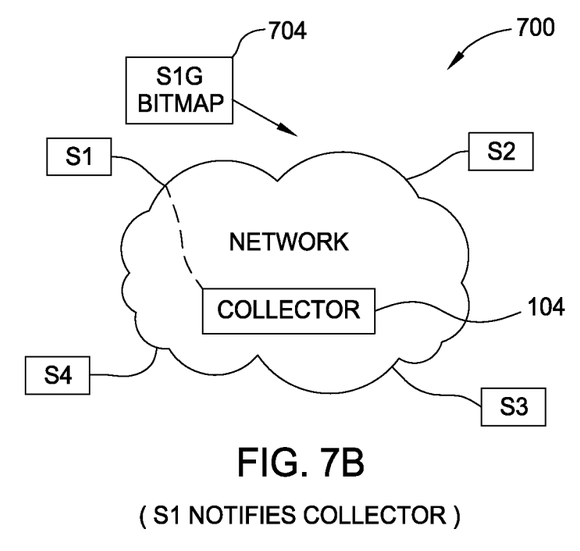
Figure 7C:
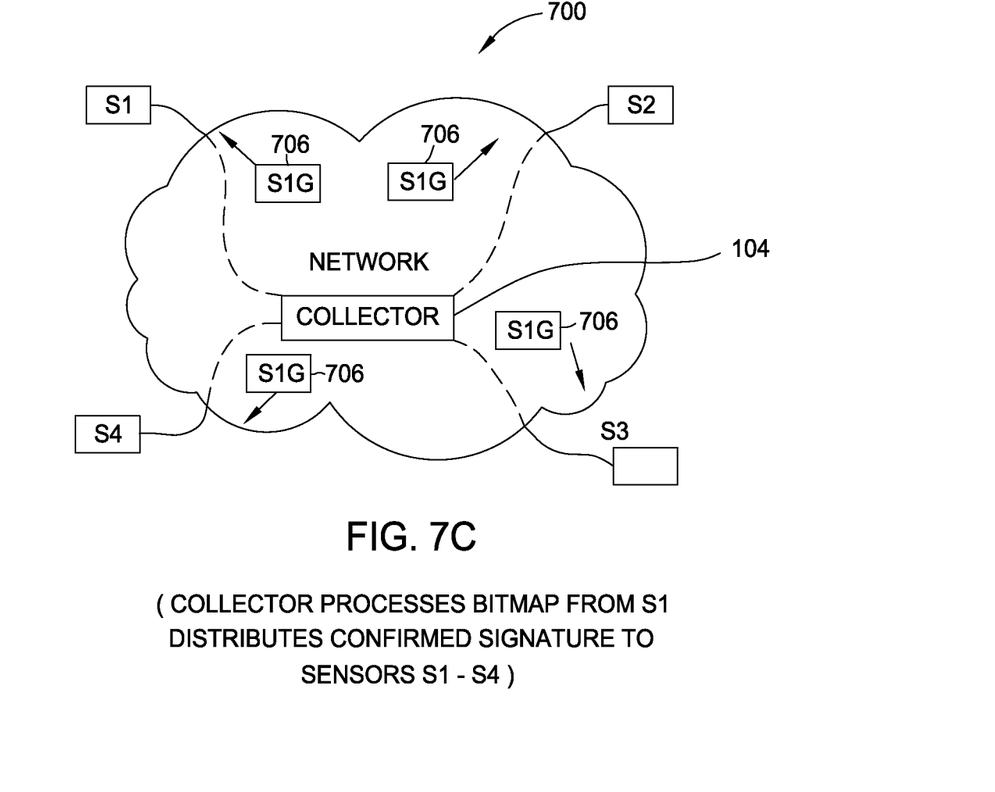

For some embodiments, notification may be sent to other nodes via the collector, as illustrated in FIGS. 7A-7C. FIG. 7A illustrates S1 detecting payload that results in the bit count exceeding the detection threshold. As described above, aggregating bit map information received from another sensor may also result in the detection threshold being exceeded.

In any case, as illustrated in FIG. 7B, S1 may send anomaly information to the collector 104. The collector 104 may serve as a repository of anomaly information and, as illustrated in FIG. 7C, may also distribute confirmed anomaly signature information to sensors S1-S4.

The distribution and detection thresholds may be set to values chosen in a manner that attempts to efficiently distribute information among sensors and classify anomalies as threats. For some embodiments, one or more of the thresholds may be adaptive. For example, the distribution threshold may be adaptive, based on network traffic. For example, if too many distribution messages are being generated, flooding the network with unnecessary traffic, the distribution threshold may be increased. As an alternative, the distribution threshold may be decreased if relatively few messages are being generated.

Some form of history-based adjustments may also be employed with either the distribution or detection thresholds. For example, one or more of these threshold values change in response to a distributed address dispersion information. Either threshold value may change, for example, based on whether the distributed address dispersion information gathered based on an anomaly signature, actually turns out to be a probable anomaly.

While the foregoing is directed to embodiments of the present disclosure, other and further embodiments of the present disclosure may be devised without departing from the basic scope thereof, and the scope thereof is determined by the claims that follow.

The invention claimed is:

1. A computer-implemented method, comprising:
by operation of a routing device, distributing information about potential anomalies in a network, comprising:
detecting matching packets with payloads that match an anomaly signature;
gathering address dispersion information for the matching packets, the address dispersion information providing an indication of a number of different addresses of the matching packets, wherein the different addresses comprise at least one of source addresses and destination addresses;
upon determining the address dispersion information indicates the number of different addresses of the matching packets exceeds a distribution threshold, requesting address dispersion information for the matching packets by distributing the address dispersion information for the matching packets to one or more peer nodes;
responsive to the request, receiving, from a peer node, additional address dispersion information for packets matching the anomaly signature;
aggregating the additional address dispersion information with the gathered address dispersion information;
upon determining the aggregated address dispersion information indicates the number of different addresses of the matching packets exceeds a detection threshold, reporting the anomaly signature as a probable anomaly; and
propagating the aggregated address dispersion information to one or more peer nodes.

2. The method of claim 1, wherein gathering address dispersion information comprises setting bits in one or more bitmaps associated with the anomaly signature based on the different addresses of the matching packets.

3. The method of claim 2, wherein gathering address dispersion information for the matching packets comprises:
setting a bit in a source address bitmap based on a source address of a matching packet; and
setting a bit in a destination address bitmap based on a destination address of the matching packet.

4. The method of claim 1, wherein:
propagating the aggregated address dispersion information to one or more peer nodes comprises propagating the address dispersion information to a limited number of peer nodes based on a distance to the peer node from which the additional address dispersion information was received.

5. The computer-implemented method of claim 1, wherein requesting address dispersion information further comprises appending a unique identifier of the routing device to the request.

6. The computer-implemented method of claim 5, further comprising:
upon determining that the unique identifier of the additional address dispersion information matches the unique identifier of the routing device, discarding the additional address dispersion information, wherein the additional address dispersion information is not aggregated, reported, or propagated.

7. A network device, comprising:
a computer processor; and
a memory containing a program that, when executed on the computer processor, performs the steps of:
detecting matching packets, received over a network, with payloads that match an anomaly signature;
gathering address dispersion information for the matching packets, the address dispersion information providing an indication of a number of different addresses of the matching packets, wherein the different addresses comprise at least one of source addresses and destination addresses;
upon determining the address dispersion information indicates the number of different addresses of the matching packets exceeds a distribution threshold, requesting address dispersion information for the matching packets by distributing the address dispersion information for the matching packets to one or more peer nodes;
responsive to the request, receiving, from a peer node, additional address dispersion information for packets matching the anomaly signature;
aggregating the additional address dispersion information with the gathered address dispersion information;
upon determining the aggregated address dispersion information indicates the number of different addresses of the matching packets exceeds a detection threshold, reporting the anomaly signature as a probable anomaly; and
propagating the aggregated address dispersion information to one or more peer nodes.

8. The network device of claim 7, wherein gathering address dispersion information comprises setting bits in one or more bitmaps associated with the anomaly signature based on the different addresses of the matching packets.

9. The network device of claim 8, wherein gathering address dispersion information for the matching packets comprises:
setting a bit in a source address bitmap based on a source address of a matching packet; and
setting a bit in a destination address bitmap based on a destination address of the matching packet.

10. The network device of claim 7, wherein propagating the aggregated address dispersion information to one or more peer nodes comprises:

propagating the aggregated address dispersion information to a limited number of peer nodes based on a distance to the peer node from which the additional address dispersion information was received.

11. The network device of claim 7, wherein requesting address dispersion information further comprises appending a unique identifier of the network device to the request.

12. The network device of claim 11, further comprising:
upon determining that the unique identifier of the additional address dispersion information matches the unique identifier of the network device, discarding the additional address dispersion information, wherein the additional address dispersion information is not aggregated, reported, or propagated.

13. An apparatus, comprising:
one or more computer processors; and
a memory containing a program that, when executed on the computer processor, performs an operation, the operation comprising:
detecting matching packets, received over a network, with payloads that match an anomaly signature;
gathering address dispersion information for the matching packets, the address dispersion information providing an indication of a number of different addresses of the matching packets, wherein the different addresses comprise at least one of source addresses and destination addresses;
upon determining the address dispersion information indicates the number of different addresses of the matching packets exceeds a distribution threshold, requesting address dispersion information for the matching packets by distributing the address dispersion information for the matching packets to one or more peer nodes in the network;
receiving, from a peer node, responsive to the request, additional address dispersion information for packets matching the anomaly signature;
aggregating the additional address dispersion information with the gathered address dispersion information;
upon determining the aggregated address dispersion information indicates the number of different addresses of the matching packets exceeds a detection threshold, reporting the anomaly signature as a probable anomaly; and
propagating the aggregated address dispersion information to one or more peer nodes.

14. The apparatus of claim 13, wherein the address dispersion information comprises one or more bitmaps associated with the anomaly signature, with bits that correspond to different addresses of the matching packets.

15. The apparatus of claim 14, wherein gathering address dispersion information comprises:
setting a bit in a source address bitmap based on a source address of a matching packet; and
setting a bit in a destination address bitmap based on a destination address of the matching packet.

16. The apparatus of claim 13, wherein propagating the aggregated address dispersion information to one or more peer nodes comprises propagating the aggregated address dispersion information to a limited number of peer nodes based on a distance to the peer node from which the additional address dispersion information was received.

17. The apparatus of claim 13, wherein requesting address dispersion information further comprises appending a unique identifier of the routing device to the request.

18. The apparatus of claim 17, the operation further comprising:
upon determining that the unique identifier of the additional address dispersion information matches the unique identifier of the network device, discarding the additional address dispersion information, wherein the additional address dispersion information is not aggregated, reported, or propagated.

* * * * *